Aug. 21, 1956    N. L. DUNCAN ET AL    2,760,127
CAPACITOR COMMUTATOR

Filed March 22, 1954                    5 Sheets-Sheet 1

INVENTORS
NESBIT L. DUNCAN
LLOYD E. ST. JEAN
BY Elmer J. Gorn
ATTORNEY

Aug. 21, 1956 N. L. DUNCAN ET AL 2,760,127
CAPACITOR COMMUTATOR

Filed March 22, 1954 5 Sheets-Sheet 3

INVENTORS
NESBIT L. DUNCAN
LLOYD E. ST. JEAN
BY Elmer J. Gorn
ATTORNEY

United States Patent Office 2,760,127
Patented Aug. 21, 1956

2,760,127

CAPACITOR COMMUTATOR

Nesbit L. Duncan, Belmont, and Lloyd E. St. Jean, Arlington, Mass., assignors to Raytheon Manufacturing Company, Waltham, Mass., a corporation of Delaware Application March 22, 1954, Serial No. 417,757

6 Claims. (Cl. 317—250)

This invention relates to a capacitor commutating device and to a method of constructing a portion thereof.

Among the characteristics desired in a commutating device are reliability, durability and high speeds of commutation of a large number of information channels. Mechanical commutators of the prior art do not possess all of these characteristics. Such mechanical commutators have been limited by contact wear to something of the order of a few million operations. If the speed of commutation is high, the life of such commutators is correspondingly low.

Capacitor commutators of the prior art have been limited to flat disc construction because of the inability to meet the concentricity requirements of cylindrical construction. Such capacitor commutators are necessarily bulky and heavy and the large capacitance between plates in existing commutating devices has made carrier type operation impractical.

In accordance with this invention, a cylindrical capacitor commutator is obtained which allows for carrier operation, the positioning of a large number of commutator signals into a minimum space, high commutation rates in excess of 50 kc. and long operating life.

The principle of operation of the commutator of the invention is that of energy transfer through a condenser. A plurality of spaced electrically conductive plates are arranged longitudinally on the inner surface of a tubular cylindrical stator and a single electrically conductive sampling plate is carried by a cylindrical rotor concentric with and slightly smaller than said stator. The rotor is rotated about the axis of both rotor and stator by a motor mounted on the same shaft as the rotor. If information groups in the form of A. C. signals are placed on the stator plates, each corresponding information group may be sequentially transferred from a corresponding stator plate to said rotor sampling plate by capacitive coupling. The commutated signal is then removed from the rotor by capacitive coupling to a stationary capacitive member mounted on the periphery of the stator. Conversely, if information is applied to the stationary capacitive member, that information may be transferred to the rotor sampling plate by capacitive coupling and then from the rotor sampling plate to successive ones of said stator plates, also by capacitive coupling.

A further improvement in commutator operation is achieved by mounting the stationary capacitive member previously referred to opposite an end face of the cylindrical rotor instead of on the stator periphery. With this arrangement the area on the periphery of the rotor and stator available for rotor sampling plate and stator segments, respectively, is greater and the length of the commutator may be correspondingly reduced.

Since the commutator of the subject invention does not involve a frictional mechanical contact between the commutator segments and the stationary capacitive member, several million selections may be made during the commutator life. The actual operating life of such a commutator is limited only by the motor bearing life which is well in excess of one thousand hours of continuous operation. By virtue of the low moment of inertia of rotating parts inherent in the compact commutator of the subject invention, the size and weight, for a given number of commutating segments, as well as the required driving power, is greatly reduced. Furthermore, because of the accuracy obtainable with cylindrical commutator construction, the output derived for each commutator segment is the same for each segment.

In order to prevent undesirable capacitive coupling between the rotor segment and stator segments adjacent to the stator segment of instantaneous interest, a Faraday shield may be associated with the segments on both the rotor and stator. The stator shield comprises a comb-shaped network of parallelly arranged electrically conductive elements inserted between corresponding adjacent stator segments while the rotor shield comprises an electrically conductive element spaced from the rotor segment and partially surrounding the rotor. Both shields are connected to ground or to any other reference potential.

A considerable reduction in weight of the commutator rotor may be achieved by forming the same of a series of interlocking cup-shaped light weight electrically conductive members instead of a solid electrically insulating body. Since the rotor is formed of an electrically conductive member instead of an insulating member, the rotor itself serves as a Faraday shield so that electrical design of the rotor is simplified. A reduction in the capacity between the rotor sampling plate and both rotor shield and ground is also achieved by use of the electrically conductive rotor. Because of the interlocking design of this rotor, it possesses greater dimensional stability with rotation so that the concentricity of the rotor and stator are maintained within desired tolerances. Because of the low moment of inertia resulting from the lightweight construction, higher speeds of operation are permissible with a rotor of this type.

This invention also incorporates the method of constructing a stator of the type described. Printed circuit techniques may be utilized to form the stator plates or segments on the inner surface of the cylindrical stator. The printed circuit comprising the stator segments is formed on a resilient electrically insulating sheet which is wrapped about a mandrel of approximately the same outer diameter as the desired inner diameter of the stator with the segments in intimate contact with the mandrel. The diameter of the mandrel will be larger than the outside diameter of the rotor by the desired spacing between rotor and stator. The sheet is bound firmly in place on the mandrel and built up slightly more than the thickness of the stator by alternate layers of electrically insulating tape of fibrous construction and a thermoplastic material. While the stator is still on the mandrel it is machined down to the correct size for proper mounting in the commutator assembly.

In the drawing.

In the drawings, corresponding elements are indicated by like reference numerals.

Figure 1:
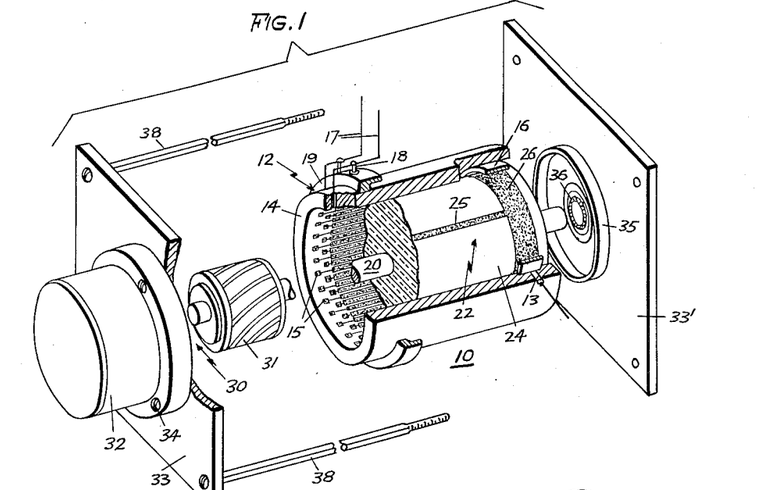
Fig. 1 is an exploded view of a capacitor commutator in accordance with the invention.

The capacitor commutator 10 of Fig. 1 comprises generally a stator assembly 12 and the rotor assembly 22. The stator assembly includes a tubular cylindrical stator body 14, hereinafter referred to simply as stator 14, of an electrically insulating material, such as plastic, upon whose inner surface an array of elongated longitudinally disposed electrically conductive segments or plates 15 (shown more clearly in Fig. 2) are mounted. Stator segments 15 may be metallic strips mounted on the inner surface of the stator or may be printed on said stator in a manner to be described subsequently. Each one of stator segments 15 is connected by leads 17 extending through one end of the stator 14 to terminals 18 on a mounting ring 19 which may be either part of the stator or a separate ring affixed thereto. In order to facilitate connection of leads 17 to the various stator segments 15, the ends of said segments may be staggered as clearly shown in Figs. 1 and 2. The number of these stator segments on the inner surface of stator 14 is equal to the maximum number of individual channels of information to be analyzed.

Mounted for rotation within stator 14 about a shaft 20 and forming a part of rotor assembly 22 is a cylindrical rotor body 24, henceforth referred to simply as rotor 24, carrying a single rotor segment or rotor sampling plate 25, one end of which is connected to a metallic rotor pickoff ring 26 located adjacent one end of the rotor. The rotor assembly 22 of the commutator is driven by a motor 30 comprising a rotor 31 attached to the shaft 20 of commutator rotor assembly 22 and a stator assembly (not shown) which is enclosed within housing 32. Housing 32 may be attached to a supporting plate 33 by screws 34. Motor 30 may be any type of alternating current motor, such as an induction motor or synchronous motor. A direct current motor is not desirable since sparking at the motor commutator would result in undesirable static charges being picked up by the stator segments 15 of the capacitor commutator.

Figure 2:
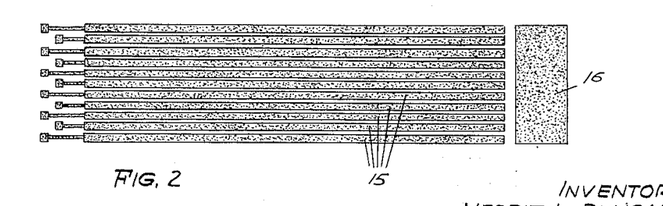
Fig. 2 is a developed lay-out of the stator element array of the commutator of Fig. 1.

Also forming a part of stator assembly 12 is an electrically conductive stator pickoff ring 16 attached to the inner surface of stator 14 at the end remote from mounting ring 19 so that it lies opposite the rotor pickoff ring 26, as shown in Fig. 1. A terminal 13 electrically connected to the stator pickoff ring 16 is provided for connection to external circuitry. Stator pickoff ring 16 may be a metallic band set into the stator body so that the inner surface of said ring is flush with the inner surface of the stator, as shown in Fig. 1; alternatively, ring 26 may be printed on the inner surface of the stator in the same manner as stator segments 15. To prevent appreciable coupling between the stator segments 15 and stator pickoff ring 16, a substantial space is maintained therebetween. The relative position of the stator pickoff ring 16 with respect to the stator segments 15 is shown in Fig. 2.

In assembling the commutator, the stator 14 is inserted over an end bell 35 in each of end plates 33 and 33' and the rotor shaft is mounted in bearings 36 in each end plate. Only one such bell and bearing is visible in Fig. 1. End plates 33 and 33' are held in fixed space relationship by means of through bolts 38, thereby maintaining the various elements of the commutator in proper relationship.

The capacitor commutator shown in the drawings is adapted to sequentially transfer information in the form of A. C. signals from a plurality of input channels to a single output circuit or to transfer input information from a single channel to a plurality of output circuits. One mode of operation of the commutating device of the invention involves applying input information from the various separate channels to one end of a corresponding stator segment 15 of the commutator. The rotating sampling plate 25 detects the signal on each of the energized stator segments sequentially. The rotor sampling plate 25 is connected to the metallic pickoff ring 26 on the rotor 24 which, in turn, is capacitively coupled to the stator pickoff ring 16. The detected signal is thus available at a single output terminal 13 connected to stator pickoff ring 16.

It is possible, of course, to operate the commutating device in the reverse direction; that is, a complex input signal should be applied to the terminal 13 connected to stator pickoff ring 16. This input signal would then be capacitively coupled to rotor pickoff ring 26, transferred through rotor sampling plate 25, and capacitively coupled from said sampling plate to each of said stator segments 15 sequentially. The signal picked up by stator segments 15 could then be applied by way of corresponding output terminals 18 to several separate output channels. For the sake of clarity in description, the term "stator pickoff ring" and "rotor pickoff ring" will be used hereinafter to designate elements 15 and 26 or 66, as the case may be, respectively, regardless of the direction of translation of energy.

Figure 3:
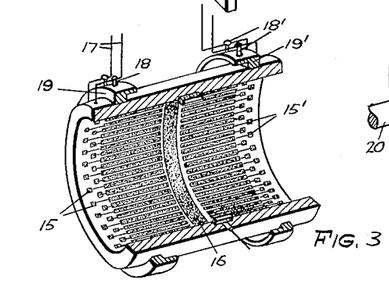
Figs. 3 and 4 are views showing modifications of the commutating device of Fig. 1 using a double bank of stator segments.
Figure 4:
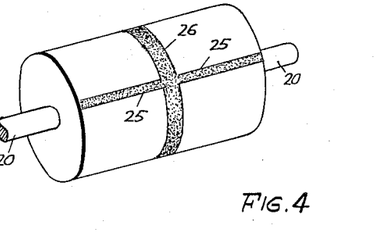

The number of channels which may be accommodated by the capacitor commutator may be increased by means of the arrangement shown in Figs. 3 and 4. Two separate arrays or banks of stator segments 15 and 15' are arranged back-to-back, with each segment of one array being in line with a segment of the other array. One end of each of the segments 15 of the first array is connected to terminals 18 on mounting ring 19, while connections from each of the stator segments 15' of the second array are connected to terminals 18' on mounting ring 19'. A single stator pickoff ring 16 common to both arrays and spaced an appropriate distance from the ends of stator segments 15 and 15' is sufficient. Stator pickoff ring 16, as shown in Fig. 3, as well as stator segments 15, are deposited on the inner surface of stator 14 by a printing technique such as described in detail later. Any method of securing electrically conductive elements 15 and 16 to the inner surface of stator 14 is, however, within the scope of this invention.

The rotor cooperating with the stator of Fig. 3 is shown in Fig. 4 and includes a single rotor sampling plate 25 and a rotor pickoff ring 26 centrally mounted on the rotor periphery so as to be in alignment with the centrally positioned stator pickoff ring 16.

Figures 5, 6, 7, 8:
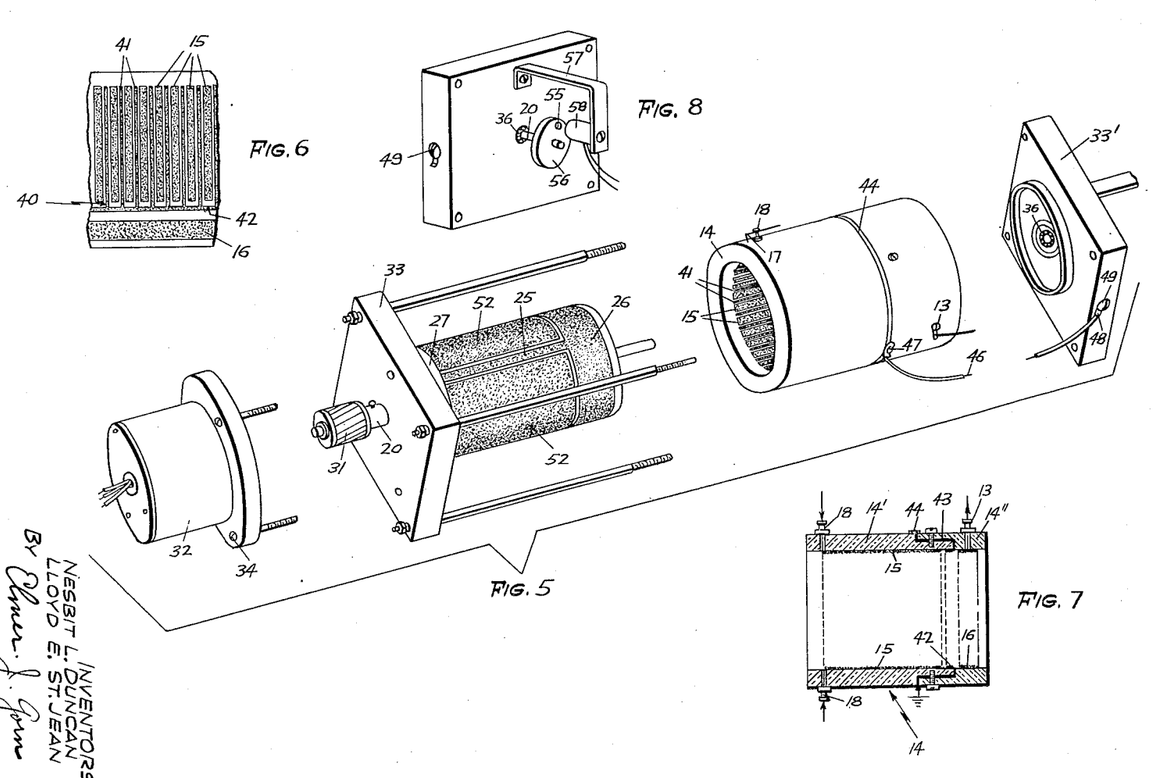
Fig. 5 is an exploded view of a modification of the commutating device of Fig. 1 having a Faraday shield associated with both rotor and stator.
Fig. 6 is a development of the stator element array of the commutating device of Fig. 5.
Fig. 7 is a cross-sectional view of the stator of the device in Fig. 5.
Fig. 8 illustrates a synchronizing pulse-forming circuit for the commutating device in Fig. 5.
Figure 9:
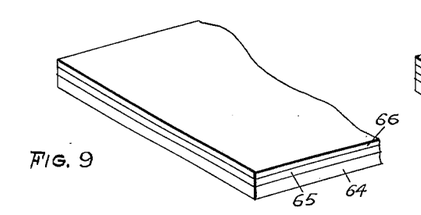
Figs. 9 to 15 are views illustrating a process of constructing a commutator stator such as shown in Fig. 5.

A further embodiment of a capacitor commutator is shown in Figs. 5 to 8. An array of stator segments 15, similar to those of Figs. 1 and 2, is deposited on the inner surface of stator 14, as by a printed circuit technique such as will be described subsequently. On end of each of the segments 15 is connected to leads 17 which pass through stator 14 and connected to terminals 18. The device of Figs. 5 to 8 includes a Faraday shield 40, which, in conjunction with the stator array already described, forms an interdigital array. The purpose of this stator shield is to minimize coupling between adjacent channels by reducing the capacitance between individual stator segments. As shown in Fig. 6, shield 40 is a comb-shaped structure having a plurality of fingers 41, each spaced from, and interleaved with, a corresponding pair of adjacent stator segments 15 and a continuous base portion 42 to which one end of each of the fingers 41 is attached. Portion 42 of the shield is connected to some circuit reference potential, such as ground. The grounded base portion 42 of shield 40 is connected to an electrically conductive band 44 surrounding the outer surface of stator 14. The grounding may be accomplished by a lead 46 connected at one end to a lug 47 attached to band 44 and at the other end to a lug 48 affixed by screw 49 to end plate 33'. The stator pickoff ring 16, which is spaced from the grounded base 42 of shield 40, is connected to an external terminal 13 affixed to the outer surface of stator 14.

Although the various stator elements of Fig. 6 may be formed on the inner surface of a single electrical body 14, it has been found desirable, particularly because of the difficulty in achieving a strong bond between the comparatively narrow base portion of the shield and the plastic cylinder, to construct the stator of two axially aligned members 14' and 14'', as shown in Fig. 7. In this case, the stator segments 15, including the Farady shield 40, are affixed to the inner surface of one member 14', while the stator pickoff ring 16 is affixed to the inner surface of the other member 14''. At one end of each of members 14' and 14'' of stator 14 are cylindrical overlapping portions of reduced cross section. The adjoining faces of these overlapping portions are covered with a layer of electrically conductive paint thus forming, when joined together, a substantially cylindrical ring 43 with oppositely directed tab portions, one of which is connected to the printed ground band 44 on the outer surface of the stator and the other of which is connected to the base portion 42 of the stator shield 40 on the inner surface of the stator, as shown in Fig. 7.

In order to further improve the portion of the capacitor commutator, a Faraday shield is associated with the rotor 24, as well as stator 14. The purpose of the rotor shield 52 is to reduce the feedthrough capacitance between non-sampled stator segments 15 and the rotor sampling plate 25 and rotor pick-off ring 26. The rotor shield 52 consists of an arcuate electrically conductive member partially surrounding the rotor and spaced from the rotor sampling plate 25 and rotor pickoff ring 26, as clearly shown in Fig. 5. The rotor shield 52 may be a thin metallic sheet wrapped about the rotor, or may be an electrically conductive layer painted or otherwise printed upon the rotor periphery. The rotor shield is connected to some desired reference potential, such as ground. To ground shield 52, a lead (not shown) may be connected between some point on the shield and the rotor shaft 20. Alternatively grounding to shaft 20 may be accomplished by extending the shield to cover one of the end of faces 27 of the rotor.

The rotor shield 52 and stator shield 40 may be used jointly or separately in a commutator device, depending upon the accuracy and type of operation required.

The width of the rotor sampling plate 25 is subject to considerable variation, depending upon the desired commutation characteristics. The width of the rotor sampling plate 25 may be greater than, equal to, or less than that of the stator segments 15. In one embodiment of the capacitor commutator, the width of the rotor sampling plate was made equal to the space between the adjacent stator segment. The smaller the width of the rotor sampling plate, the better is the definition or resolution per segment of the commutator, all other things being equal.

Figure 16:
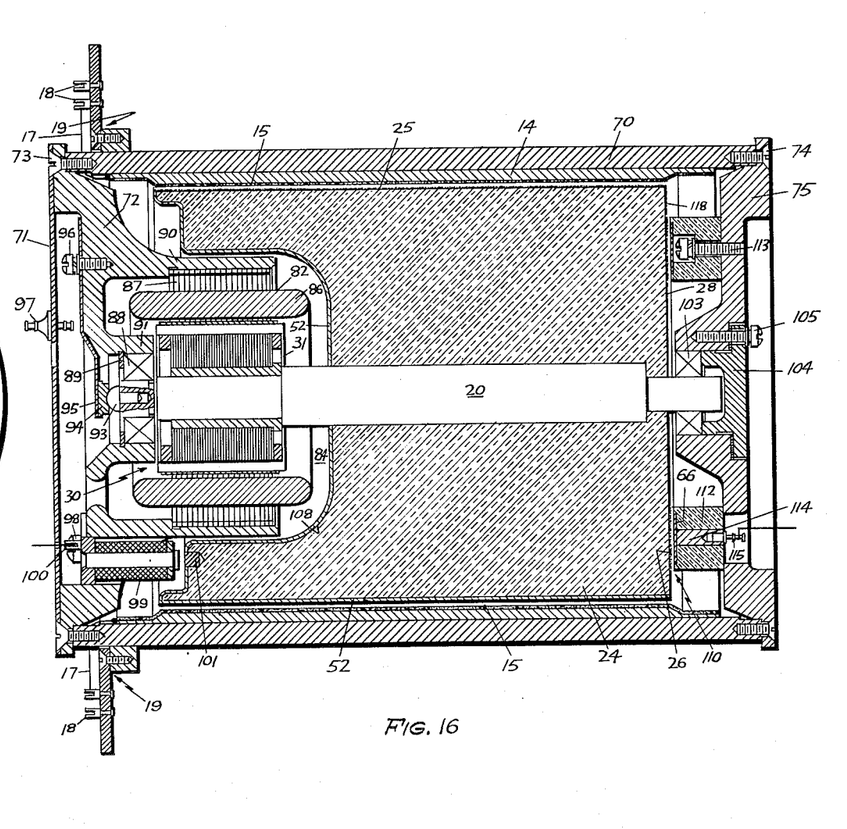
Fig. 16 is a central cross-sectional view of a further embodiment of the invention incorporating pickoff slip ring capacitance at the end face of the rotor rather than at the rotor periphery.

It is often desirable, particularly in applications in which the information derived from the commutator is applied to a presentation indicator such as a cathode ray tube, to synchronize the indicator sweep with the position of the rotor 24. In order to provide a synchronizing pulse, a magnet 55 is imbedded in a non-magnetic disc 56 attached to the portion of rotor shaft 20 extending beyond end plate 33', as shown in Fig. 8. An iron core coil 58 is attached to a bracket 57 which, in turn, is attached to end plate 33'; coil 58 is so mounted as to be in proximity with magnet bearing disc 56. Once during each revolution of rotor 14 magnet 55 sweeps past coil 58 and induces a voltage therein in accordance with well-known generator principles. Synchronizing magnet 55 may also be directly imbedded in the rotor, as shown in Fig. 16, to be described later.

Figure 10:
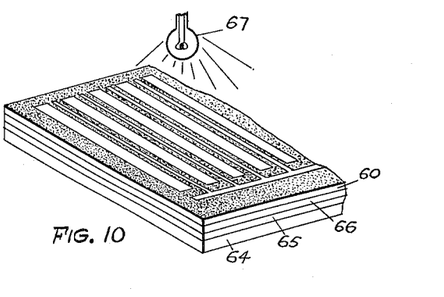
Figure 11:
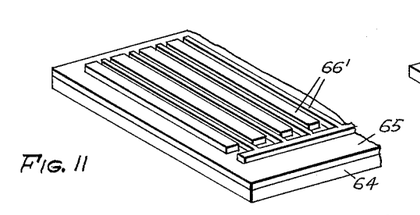
Figure 12:
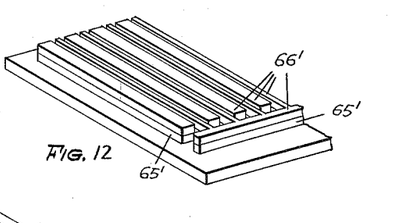

A method for constructing a stator body carrying an array of stator segments and associated stator shield is shown in Figs. 9 to 15. For reasons of clarity the thickness of certain layers of materials is exaggerated. A layout of the particular stator array desired is made, as for example, by drawing ink on white drawing paper. A picture is taken of this layout by means of a camera having a reasonably high quality lens. A printing negative 60, shown in Fig. 10, is then produced by standard photographic techniques so that the light portions thereof correspond in configuration to that of the stator array, while the dark portions of the negative correspond to the portion of the original layout not covered by drawing ink. To insure greater accuracy the layout may be considerably enlarged and a photoreduction process resorted to in order to obtain the negative of the desired size. Alternatively, the negative may be derived by means of a so-called step and repeat process well known in the photo-engraving art. Essentially, this process involves scribing out the emulsion of the negative in accordance with the desired configuration of one of the elements of the stator array with a scriber adapted to be moved with extreme accuracy by micrometer adjustment. A film strip equal in length to the inner circumference of the cylindrical stator body to be formed is placed on a table which is movable by accurately controlled amounts. The aforesaid negative is mounted over the film strip and both are exposed to a high intensity light source mounted on said movable table. The table is moved to a new position determined by the desired spacing between elements of the stator array and another exposure made. This process is repeated until a desired number of exposures equal to the number of elements of the stator array are completed.

A resilient acid-resistant plastic base sheet 64, such as a polyester resin plastic sheet about .010 inch to .020 inch thick, is coated with a thin layer or film 65 of material, such as copper or silver or a combination of both. The copper-clad sheet 64, 65 is next coated with a light-sensitive enamel 66, such as a dichromate solution, which is impervious to acid. See Fig. 9. After the enamel has dried sufficiently, the negative 60 is placed over the sensitized base sheet 64 to 66 and the masked sheet is exposed to high intensity source of light 67 for a predetermined time, dependent in part upon the type of enamel and the intensity of the light source, as shown in Fig. 10.

The light passing through the transparent regions of negative 60 causes the portion 66' of the enamel layer 66, corresponding to the transparent regions of negative 60, to harden while the remaining portion of the enamel layer remains relatively soft. After removing the negative, the unhardened portion of enamel layer 66 is washed away by means of a suitable enamel solvent, such as alcohol or water, leaving the structure shown in Fig. 11. The sheet is next exposed to heat until the enamel surface still extant is completely dried and hardened. This surface 66', shown in Fig. 11, now serves as a resist which is impervious to the action of acids. The sheet is next etched in an acid solution which depends upon the material of layer 65. If layer 65 is copper, an etching solution of ferric chloride may be used. As soon as the areas of the metallic layer 65 on base sheet 64 not protected by the enamel resist 66' are completely removed by the chemical action of the etching solution, the sheet is rinsed, thereby leaving the enamel coated structure shown in Fig. 12. Enamel resist 66' is next removed by an appropriate enamel remover, such as a caustic potash solution, leaving the copper clad base plate, shown in Fig. 13, which bears the desired stator array.

Figure 13:
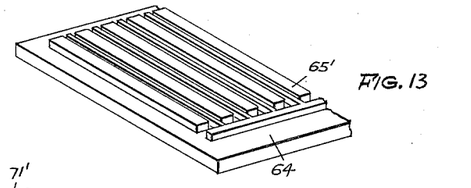
Figure 14:
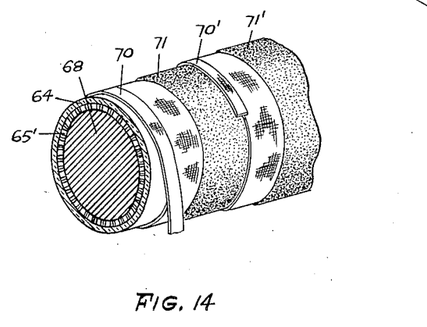
Figure 15:
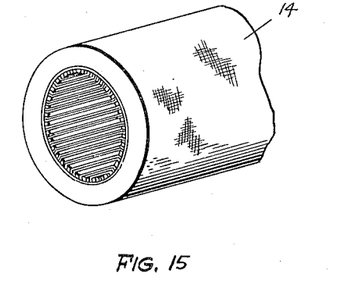

The resilient copper clad sheet 64, 65 of Fig. 13 is now wrapped around a mandrel 68 whose outer diameter is equal to the desired inside diameter of the stator cylinder. The sheet is attached to the periphery of mandrel 68 with the copper layer 65' representing the stator segments and shield in contact with the mandrel and with the stator segments longitudinally disposed along the mandrel by means of one or more layers of an electrically insulating tape 70 which is pervious to a liquid thermoplastic. Tape 70 may be made of spun glass cloth about one-quarter inch wide although any tape which is an electrical insulator and which is of gauzy or mesh type construction, such as nylon or cotton, could be used. The tape is applied under a tension of approximately ten pounds in order to firmly bind the copper clad base sheet 64, 65' to the mandrel. A layer of plastic 71 in liquid form is applied, as by a brush, over the layer of glass tape 70. The plastic 71 is absorbed in the interstices in the glass tape. After allowing sufficient time for the plastic layer to be absorbed into the tape and to dry and harden, another layer or layers 70' of glass tape is applied and a second layer 71' of plastic applied over layer 70'. This alternate application of tape and plastic is repeated until the desired stator thickness is obtained. In practice it is usually desirable to build up the stator oversize and machine the stator down to the desired outside diameter. The mandrel 68 is then forced from the inside of stator 14, leaving the completed stator assembly shown in Fig. 15.

Figure 17:
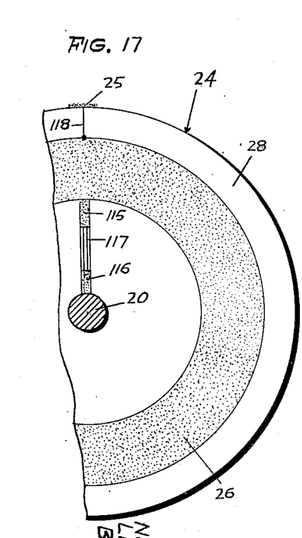
Fig. 17 is a fragmentary end view of the rotor of Fig. 16.

A further embodiment of the invention is shown in Figs. 16 and 17 which differs essentially from the commutating devices previously shown in two respects. The capacitive pickoff is achieved at the end face of the rotor rather than from the periphery thereof, as in the case of the previously-described devices. In the device of Figs. 16 and 17 a recess is provided in one end of the rotor in which the rotor driving means may be installed. By thus hollowing out one end of the rotor, a lighter construction is obtained as well as economy of space.

The energy translation circuit between the input and output terminals of the capacitor commutators of the invention consists essentially of two capacitances in series. One capacitance is that between the stator segment or plate and the rotor sampling plate, while the other capacitance is that between the rotor pickoff ring and a second pickoff ring which, in the devices of Figs. 1 to 8, is positioned on the stator. Because of the location of the second pickoff ring (previously referred to as the stator pickoff ring) mounted on the periphery of the stator at one end thereof, as shown in the capacitor commutator of Figs. 16 and 17, and because the rotor pickoff ring lies opposite this second pickoff ring, the space which can be allocated to stator segments and rotor sampling plates is necessarily reduced. In other words, the length of the stator segments and rotor sampling plates is reduced and the capacitance presented therebetween, for a given width of segment or plate, is decreased. By mounting the rotor pickoff ring 26 on the end face 28 of the rotor, as in Figs. 16 and 17, and positioning the second pickoff ring 66 (corresponding to stator pickoff ring 16 of the previously-described devices) adjacent to and concentric with the rotor pickoff ring 26, the entire length of the rotor and stator is available for stator and rotor capacitor plates and the large number of stator segments may be provided for a given size stator body. Furthermore, the capacitance between the rotor pickoff plate 26 and the pickoff ring 66 or 16, as the case may be, should be large in comparison with the capacitance between a stator segment 15 and rotor sampling plate 25 in order that the losses in the former be minimized. The rotor pickoff ring capacitance should be considerably greater than that of the rotor sampling plate so that the total series capacitance is approximately equal to the capacitance of the rotor sampling plate. If a large rotor pickoff ring were positioned on the periphery of the rotor, however, the commutator would have to be made correspondingly longer to also accommodate the various rotor and stator segments. By mounting the pickoff rings on the end face of the rotor, the area which is available on the rotor and stator periphery for the commutator segments, for a given commutator length, is increased.

Referring again to Figs. 16 and 17, the cylindrical stator body 14 of an electrically insulating material such as plastic is mounted, as by a shrink fit, within a cylindrical housing 70 which extends slightly beyond the ends of stator body 14. An end cover plate 71 and a first end bell 72 are fastened at one end of the stator housing 70 by screws 73. Attached to the other end of the stator housing 70 by screws 74 is a second end bell 75. A driving motor 30 comprising a rotor assembly 31 and a stator assembly 82 is mounted within a recessed portion 84 at one end of the cylindrical rotor 24. The rotor 24 is constructed of a light-weight electrically insulating material, such as plastic. The stator assembly 82 includes a winding 86 and a core 87 which is fixedly attached, as by keying, to an elongated portion 90 of the end bell 72 which extends into the recessed portion 84 of commutator rotor 24.

The rotor assembly 31 of driving motor 30 is mounted on one end of shaft 20 of the commutator rotor 24 and is mounted concentric with the motor stator assembly 82, as shown in Fig. 16. One end of shaft 20, which is embedded in rotor 24, is mounted in a bearing 88 which, together with bearing retaining ring 89, is affixed to a reduced portion 91 of end bell 72. A grounding assembly for the commutator includes a round head metallic pin 93 inserted in the end of shaft 20, an electrically conductive brush 94 fastened to a resilient member 95 and a terminal screw 96 for attaching member 95 to end bell 72. The leads for energizing motor 30, not shown in Fig. 16 for the sake of clarity, are fastened to terminals 97, which, in turn, are attached to cover plate 71; only one of the terminals 97 is shown in Fig. 16.

Also attached to end bell 72 by a screw 98 is a synchronizing coil 99, similar to that described in Fig. 8, having terminals 100 (one of which is visible in Fig. 16) which may be brought out through an aperture in cover plate 71. A magnet 101 is embedded in the rotor opposite coil 99.

The commutator rotor 24 is made of an electrically insulating material, such as plastic. A single longitudinally disposed rotor segment or sampling plate 25 is carried on the periphery of rotor 24 and may be printed thereon in the manner shown in Figs. 1 and 4. Alternatively, rotor sampling plate 25 may be a metal strip inserted in the surface of rotor 24. The sampling plate 25 of the device of Fig. 16, unlike that of the commutating devices previously shown, extends the entire length of rotor 24. A rotor shield 52 partially surrounds the rotor and is spaced from the rotor sampling plate 25, as in the case of shield 52 of Fig. 5. Rotor shield 52 may be printed or painted on the surface of the rotor or may be a thin metallic layer attached to the rotor surface. As shown in Fig. 16 the shielding may be made more effective by coating the recessed end face 108 of rotor 24 in addition to the periphery of said rotor.

In order to distinguish the rotor sampling plate 25 and the rotor shield 52 more clearly in the drawing, the former is shown as a printed layer and the latter as a metallic sheet. It should be understood, however, that a printed circuit or metallic sheet may be used interchangeably for either sampling plate 25 or shield 52. Because of the irregularity of the recessed end face 108 of rotor 24, it is more convenient to employ a printed circuit technique, such as the painting or spraying of silver paint, in constructing the rotor shield in the region of the aforesaid end face 108.

Contiguous to the rotor sampling plate 25 is a plurality of stator segments 15 which may extend the entire length of the commutator stator 14. Each of the stator segments 15 is connected externally of the housing by leads 17 brought out through apertures or slots at the end of stator housing 70 and connected to corresponding terminals 18 attached to mounting ring 19 surrounding housing 70.

The end of shaft 20 remote from the rotor end is mounted in a bearing 103 retained in bearing retainer 104; the latter is connected by screws 105 to end bell 75.

Fig. 17 clearly illustrates the rotor pick-off plate or ring 26 which is mounted on end face 108 of rotor body 24. The rotor pick-off ring 26 consists of an annular electrically conductive layer or sheet, shown by way of example as a printed circuit, although an annular member of sheet metal affixed to end face 108 may also be used. An electrically conductive element, such as wire 118, serves to interconnect the edge of rotor sampling plate 25 and the rotor pick-off ring 26.

A stationary pick-off ring assembly 110 comprising an annular member 112 made of an electrically insulating material, such as plastic, is mounted to the end bell 75 by mounting screws 113. The pick-off ring 66 consists of an annular metallic member inserted in the face of member 112 contiguous to rotor pick-off ring 26. If desired, pick-off ring 26 may be painted on the surface of annular member 112. A metallic insert 114 in member 112 and a terminal 115 attached to insert 114 provide means for connecting the capacitive elements of the commutator to external circuitry.

In order to drain off electrostatic charges built up on the rotor sampling plate 25, a resistor 117 is printed on the end face 108 of rotor 24 and is interconnected by printed strips 115 and 116 between the rotor pick-off ring 26 and the grounded rotor shaft 20.

Figure 18:
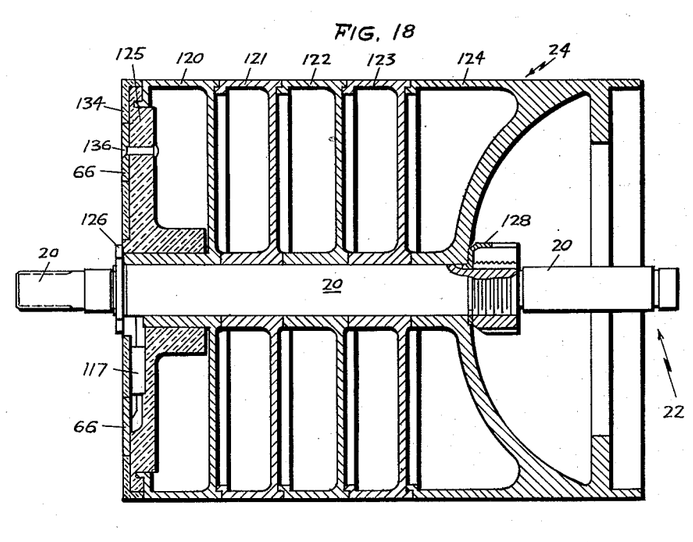
Figs. 18 to 20 are views illustrating still another embodiment of the invention comprising a plurality of interlocking electrically conductive members.
Figure 19:
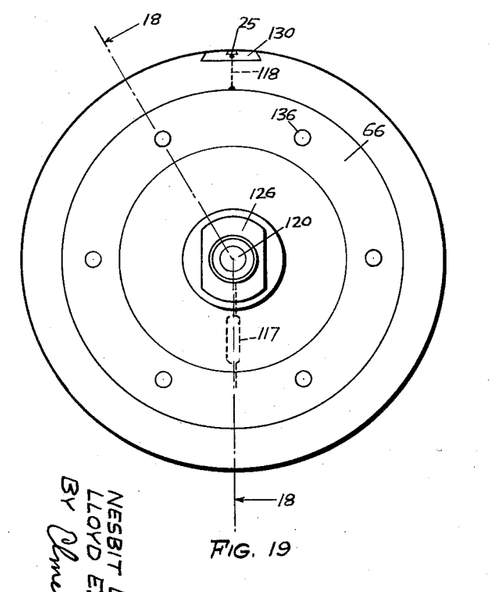
Figure 20:
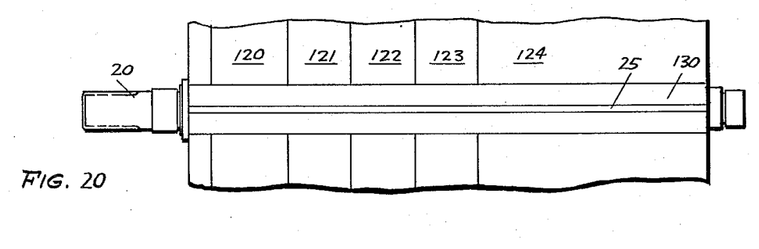

Modification of the commutator rotor of Figs. 16 and 17 is shown in Figs. 18 to 20 and comprises a series of interlocking cup-shaped members 120 to 124 made of a lightweight electrically conductive material, such as aluminum, and an end cap 125 which is made of an electrically insulating material, such as plastic. The centrally located members 121 to 123 are substantially identical and the number used depends upon the desired length of the rotor 24. End member 124 has an arcuate rib portion which provides means for insertion of a driving motor, in the manner shown in Fig. 16. The members 120 to 125 are mounted about rotor shaft 20 which has a collar 126 near one end thereof. A nut 128 engaging a threaded portion of shaft 20 near the other end of the shaft serves to firmly interconnect the various members of the rotor so that a continuous cylindrical surface is presented to the commutator stator. The rotor sampling plate 25 is insulated from the metallic rotor 24 by embedding it in a longitudinal plastic insert 130 contained in a slot milled out of the rotor. Insert 130, as well as sampling plate 25, has sloping sides in order to decrease the tendency for these parts to fly apart due to centrifugal force at higher speeds of rotation. An electrically insulating layer 134, such as fiberglass, is attached to plastic end cap 125 of rotor assembly 22. The fiberglass compound may, for example, be applied in successive layers to end cap 125 until built up to the desired size and may then be ground smooth. Embedded in layer 134 is a thin metallic pick-off ring 66 which is attached to end cap 125 by rivets 136; alternatively, an electrically conductive paint may be applied to the end face of the rotor to form the pick-off ring 66.

In order to prevent accumulation of electrostatic charges on the rotor, the resistor 117 is interconnected between rotor shaft 20 and pick-off ring 66. This resistor may be inserted in a radial slot in the rotor end cap 125 and may be potted in plastic. The resistor leads may be soft soldered to the shaft 20 and pick-off ring 25. The static bleeder resistance shown in Figs. 16 and 17 and Figs. 18 and 19 is interchangeable.

The rotor of Figs. 18 to 20, being of an electrically conductive material, serves as the Farady shield for the rotor. With the aluminum rotor of Figs. 18 to 20 the capacitance from rotor sampling plate 25 to rotor shield or ground is substantially reduced and the amplitude of the signal transferred from the commutator input and output terminals is increased.

The rotor of Figs. 18 to 20 may be inserted in place of the rotor of Figs. 16 and 17 in the assembly shown in Fig. 16.

A number of commutator assemblies, such as already described, may be combined on a single shaft to increase the number of channels which may be commutated.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A capacitive commutator comprising an elongated tubular cylindrical stator whose axial length is large compared with its diameter, said stator carrying on the inner surface thereof a first array of spaced elongated electrically conductive stator elements arranged parallel to the longitudinal axis of said stator and a second array of elongated stator elements arranged in line with corresponding elements of said first array and spaced therefrom, each of said stator elements being adapted to be connected to a separate electrical network, said stator elements extending over a major portion of the entire length of said stator, a cylindrical rotor concentrically arranged with respect to said stator and carrying on the periphery thereof an elongated longitudinally disposed electrically conductive rotor element whose width is of the order of magnitude of that of said stator element and whose length is substantially equal to that of said stator elements, said rotor being mounted for rotation with respect to said stator, said rotor element being capacitively coupled to successive ones of said stator elements of each array in response to rotation of said rotor, a first annular electrically conductive member centrally mounted on said rotor and electrically connected to said rotor element, a second annular electrically conductive member fixedly mounted on said stator between said arrays in capacitive coupling relationship with said first conductive member, and a terminal connected to said second conductive member.

2. A capacitive commutator comprising an elongated tubular cylindrical stator whose axial length is large compared with its diameter, said stator carrying on the inner surface thereof a plurality of spaced elongated electrically conductive stator elements arranged parallel to the longitudinal axis of said stator, each of which is adapted to be connected to a separate electrical network, said stator elements extending over a major portion of the entire length of said stator, a cylindrical rotor concentrically arranged with respect to said stator and mounted for rotation with respect thereto, said rotor comprising a series of interlocking cup-shaped members constructed of electrically conductive material and carrying on the periphery an elongated longitudinally disposed electrically conductive rotor element coextensive with said stator elements and insulatedly mounted on the outer periphery of said rotor, said rotor element being capacitively coupled to successive ones of said stator elements in response to rotation of said rotor, a first annular electrically conductive member mounted at one end of said rotor and electrically connected to said rotor element, a second annular electrically conductive member disposed adjacent said first member in capacitive coupling relationship therewith, and a terminal connected to said second member.

3. A capacitive commutator comprising an elongated tubular cylindrical stator, said stator carrying on the inner surface thereof a first array of spaced elongated electrically conductive stator elements arranged parallel to the longitudinal axis of said stator and a second array of elongated stator elements arranged parallel to the longitudinal axis of said stator and arranged in line with corresponding elements of said first array, each of said stator elements being adapted to be connected to a separate electrical network, said stator elements extending over a major portion of the entire length of said stator, a cylindrical rotor concentrically arranged with respect to said stator and carrying on the periphery thereof an elongated longitudinally disposed electrically conductive rotor element, whose width is substantially of the order of magnitude of that of said stator element and whose length is substantially equal to that of said stator elements, said rotor being mounted for rotation with respect to said stator, said rotor element being capacitively coupled to successive ones of said stator elements of each array in response to rotation of said rotor, a first annular electrically conductive member mounted on said rotor and electrically connected to said rotor element, and a second annular electrically conductive member fixedly mounted on said stator between said arrays in capacitive coupling relationship with said first conductive member.

4. A capacitive commutator comprising an elongated tubular cylindrical stator, said stator carrying on the inner surface thereof a first array of spaced elongated electrically conductive stator elements arranged parallel to the longitudinal axis of said stator and a second array of elongated stator elements arranged parallel to the longitudinal axis of said stator and spaced from corresponding elements of said first array, each of said stator elements being adapted to be connected to a separate electrical network, said stator elements extending over a major portion of the entire length of said stator, a cylindrical rotor concentrically arranged with respect to said stator and carrying on the periphery thereof an elongated longitudinally disposed electrically conductive rotor element whose width is substantially of the order of magnitude of that of said stator element and whose length is substantially equal to that of said stator elements, said rotor being mounted for rotation with respect to said stator, said rotor element being capacitively coupled to successive ones of said stator elements of each array in response to rotation of said rotor, a first annular electrically conductive member mounted on said rotor and electrically connected to said rotor element, and a second annular electrically conductive member fixedly mounted on said stator between said arrays in capacitive coupling relationship with said first conductive member.

5. A capacitive commutator comprising an elongated tubular cylindrical stator, said stator carrying on the inner surface thereof a first array of spaced elongated electrically conductive stator elements arranged parallel to the longitudinal axis of said stator and a second array of elongated stator elements arranged parallel to the longitudinal axis of said stator and spaced from corresponding elements of said first array, each of said stator elements being adapted to be connected to a separate electrical network, said stator elements extending over a major portion of the entire length of said stator, a cylindrical rotor concentrically arranged with respect to said stator and carrying on the periphery thereof an elongated longitudinally disposed electrically conductive rotor element whose width is substantially of the order of magnitude of that of said stator element and whose length is substantially equal to that of said stator elements, said rotor being mounted for rotation with respect to said stator, said rotor element being capacitively coupled to successive ones of said stator elements of each array in response to rotation of said rotor, a first annular electrically conductive member centrally mounted on said rotor and electrically connected to said rotor element, and a second annular electrically conductive member fixedly mounted on said stator between said arrays in capacitive coupling relationship with said first conductive member.

6. A capacitive commutator comprising an elongated tubular cylindrical stator, said stator carrying on the inner surface thereof a first array of spaced elongated electrically conductive stator elements arranged substantially parallel to the longitudinal axis of said stator and a second array of elongated stator elements arranged substantially parallel to the longitudinal axis of said stator and spaced from corresponding elements of said first array, each of said stator elements being adapted to be connected to a separate electrical network, a cylindrical rotor concentrically arranged with respect to said stator and carrying on the periphery thereof an elongated longitudinally disposed electrically conductive rotor element whose width is substantially of the order of magnitude of that of said stator element, said rotor being mounted for rotation with respect to said stator, said rotor element being capacitively coupled to successive ones of said stator elements of each array in response to rotation of said rotor, a first annular electrically conductive member mounted on said rotor and electrically connected to said rotor element, and a second annular electrically conductive member fixedly mounted on said stator between said arrays in capacitive coupling relationship with said first conductive member.

References Cited in the file of this patent

UNITED STATES PATENTS

| | | |
|---|---|---|
| 2,247,783 | Massolle | July 1, 1941 |
| 2,318,935 | Fisher | May 11, 1943 |
| 2,349,620 | Hansen | May 23, 1944 |
| 2,409,876 | Martin | Oct. 22, 1946 |
| 2,474,988 | Sargrove | July 5, 1949 |
| 2,558,925 | Bowman | July 3, 1951 |
| 2,667,615 | Brown | Jan. 26, 1954 |
| 2,678,435 | Vaughan | May 11, 1954 |
| 2,679,551 | Newby | May 25, 1954 |
| 2,695,351 | Beck | Nov. 23, 1954 |